(12) United States Patent
Ryman

(10) Patent No.: US 12,451,638 B2
(45) Date of Patent: Oct. 21, 2025

(54) HIGH CURRENT TERMINAL ASSEMBLY, ELECTRIC MACHINE AND BATTERY INCLUDING SUCH A HIGH CURRENT TERMINAL ASSEMBLY

(71) Applicant: OETIKER SCHWEIZ AG, Horgen (CH)

(72) Inventor: Morgan Ryman, Anderstorp (SE)

(73) Assignee: OETIKER SCHWEIZ AG, Horgen (CH)

( * ) Notice: Subject to any disclaimer, the term of this patent is extended or adjusted under 35 U.S.C. 154(b) by 173 days.

(21) Appl. No.: 17/927,924

(22) PCT Filed: May 28, 2020

(86) PCT No.: PCT/EP2020/064929
§ 371 (c)(1),
(2) Date: Nov. 28, 2022

(87) PCT Pub. No.: WO2021/239240
PCT Pub. Date: Dec. 2, 2021

(65) Prior Publication Data
US 2023/0216230 A1 Jul. 6, 2023

(51) Int. Cl.
*H01R 13/426* (2006.01)
*H01M 50/543* (2021.01)
(Continued)

(52) U.S. Cl.
CPC ........ *H01R 13/426* (2013.01); *H01M 50/543* (2021.01); *H01R 13/627* (2013.01); *H02K 5/225* (2013.01)

(58) Field of Classification Search
CPC .... H01R 13/04; H01R 13/627; H01R 13/422; H01R 13/426; H01R 13/428;
(Continued)

(56) References Cited

U.S. PATENT DOCUMENTS 3,229,244 A * 1/1966 Bachman ............. H01R 13/426
439/744
3,390,376 A 6/1968 Nava
(Continued)

FOREIGN PATENT DOCUMENTS

BE 720589 A 3/1969
GB 1135195 A 12/1968

OTHER PUBLICATIONS

International Search Report, App. No. PCT/EP2020/064929, dated Feb. 23, 2021, entire document.

*Primary Examiner* — Tulsidas C Patel
*Assistant Examiner* — Carlos E Lopez-Pagan
(74) *Attorney, Agent, or Firm* — David L. Nocilly; Bond Schoeneck & King PLLC

(57) ABSTRACT

A high current terminal assembly including a conductor terminal arranged to be mounted in an orifice in a housing wall, and a mounting module for mounting the conductor terminal to the housing wall. The mounting module includes a collar configured to abut to a first side of the housing wall surrounding the orifice, and an insertion part inserted into the orifice of the housing wall. A remote end of the insertion part is provided with first snap-fitting structures engaging a second side of the housing wall opposite to the first side of the housing wall, and a first end of the conductor terminal is inserted into an opening of the mounting module such that engagement of first snap-fitting structures with a second side the housing wall is locked by the insertion of the first end of the conductor terminal.

7 Claims, 4 Drawing Sheets

(51) Int. Cl.
*H01R 13/627* (2006.01)
*H02K 5/22* (2006.01)

(58) Field of Classification Search
CPC ............. H01R 13/434; H01R 33/0845; H01M 50/543; H02K 5/225
See application file for complete search history.

(56) References Cited

U.S. PATENT DOCUMENTS

| | | | | |
|---|---|---|---|---|
| 3,475,720 A * | 10/1969 | Culver | ................ | H01R 13/426 439/744 |
| 5,653,606 A * | 8/1997 | Chrysostomou | ..... | H01R 13/627 439/352 |
| 5,653,612 A * | 8/1997 | Peterson | ............. | H01R 13/434 439/745 |
| 5,934,945 A * | 8/1999 | Petersen | ............. | H01R 13/426 439/744 |
| 7,008,270 B1 * | 3/2006 | Huh | ................... | H01R 13/2421 439/700 |
| 2002/0177341 A1 * | 11/2002 | Stein, Sr. | ............. | H01R 4/4846 439/260 |
| 2020/0044387 A1 * | 2/2020 | Chiang | ................ | H01R 13/627 |

* cited by examiner

HIGH CURRENT TERMINAL ASSEMBLY, ELECTRIC MACHINE AND BATTERY INCLUDING SUCH A HIGH CURRENT TERMINAL ASSEMBLY

CROSS-REFERENCE TO RELATED APPLICATIONS

The present application is a US national stage application of International Application No. PCT/EP2020/064929, filed on May 28, 2020.

BACKGROUND OF THE INVENTION

Field of the Invention

The invention relates to a high current terminal assembly and to various electric devices including such an high-current terminal assembly. Specifically, the invention relates to high current terminals for use in electric vehicles and other high current environment.

Description of the Related Art

The demand for high current terminal technology which is robust, and error-proof in mounting increases in particular with increasing demand on electric vehicles. Generally, electric vehicles are powered by a direct current (DC) battery, which is used to power a motor. Electric cars use an inverter to convert the DC power from the battery to alternating current (AC) power. The inverter can change the speed at which the motor rotates by adjusting the frequency of the alternating current. Since electric vehicles use high current circuitry, damage to the terminals can be extremely dangerous and lead to accidents and fire.

Known high current terminal assemblies include a metallic conductor terminal mounted in an orifice in a housing wall and a non-conductive mounting module for mounting the conductor terminal to the housing wall. In the case of double-wall structures, it is known to mount a male and a female terminal part in the walls of the double-wall structure, respectively, each being held by a corresponding non-conductive mounting module.

The assembly and mounting of known high current terminals is complex and prone to errors.

BRIEF SUMMARY OF THE INVENTION

The invention seeks to provide a high current terminal and electrical devices including such a high current terminal which is easy to assemble and wherein assembly errors are unlikely to occur.

The above object is achieved by a high current terminal assembly according to claim 1 and by devices including such a high-current terminal.

The invention starts from a high current terminal assembly including a conductor terminal and a mounting module for mounting the conductor terminal to a housing wall. The conductor terminal being operatively arranged to be mounted in an orifice in the housing wall and is made of an electrically conductive material, e.g. of steel with a nickel-plated finish.

The mounting module is a non-conductive element, e.g. made of plastics and includes a collar structure configured to abut to a first side of said housing wall surrounding said orifice, and an insertion part of generally cylindrical shape configured to be inserted into the orifice of the housing wall. A remote end of the insertion part in the insertion direction is provided with first snap-fitting structures engaging a second side of said housing wall opposite to the first side of the housing wall.

The invention proposes that first end of the conductor terminal shall be configured to be inserted into a central opening of the mounting module such that engagement of first snap-fitting structures with the a second side said housing wall is locked by the insertion of said first end of said conductor terminal. In the context of the invention, "locking" means that the snap-fitting connection cannot be released while the conductor terminal is in its inserted position. By providing a snap-fitting connection between the mounting module and the housing wall, a quick and easy assembly can be achieved. The locking of the connection with the conductor terminal has the twofold advantage that a secure connection can be ensured and that assembly errors can be avoided. A locking of the connection is not possible if the snap-fitting structures are not properly snapped in.

The remote end of the conductor terminal is preferably configured to deflect the ends of the snap-fitting structures radially outward when being inserted into the opening of said mounting module and includes a recessed step portion for accommodating the ends of the snap-fitting structures when the conductor terminal has reached its final insertion position.

It is further proposed that a proximal end of the conductor terminal includes an abutment collar abutting with an end face of the mounting module when the conductor terminal has reached its final insertion position.

It is further proposed that the assembly further includes an O-ring to be arranged on an outer circumference of the conductor terminal. This enables a simple and reliable sealing.

In a further preferable embodiment of the invention, the collar structure includes a ring-shaped recess configured to accommodate an axial collar surrounding said orifice provided on the first side of said housing wall, wherein an O-Ring is provided between a radially outer surface of the axial collar of the housing wall an inner surface of the ring-shaped recess.

A further example if the invention is a system including a first and a second connector assembly configured to mount first and second conductor terminals in orifices in a first and second housing wall, wherein the first and second housing wall form a double-wall and wherein the mount first and second conductor terminals are matching male and female connector terminals engaging with each other in a mounted condition, characterized in that at least one of the first and a second connector assemblies is a connector assembly as described above.

A further aspect of the invention relates to an electric rotating machine including at least one connector assembly as described above. A yet further aspect of the invention relates to Battery including at least one connector assembly as described above.

Further features and advantages are described in the following description of preferred embodiments or illustrated in the drawings. The skilled person will be able to consider further combinations or sub-combinations of the features of the invention in order to adapt the invention to his specific needs without departing from the scope of the invention as defined by the claims.

BRIEF DESCRIPTION OF THE SEVERAL VIEWS OF THE DRAWING(S)

DETAILED DESCRIPTION OF THE INVENTION

Figure 1:
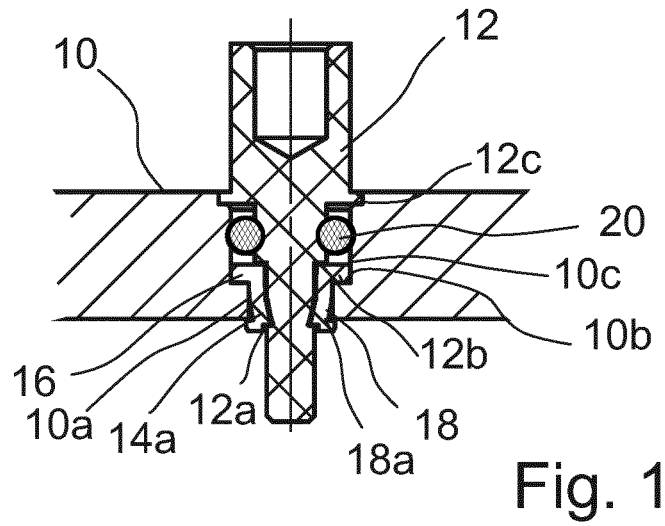
FIG. 1 illustrates a high current terminal assembly according to a first embodiment of the invention in a sectional view.

FIG. 1 illustrates a high current terminal assembly including a conductor terminal 12 and a mounting module 14a for mounting the conductor terminal 12 to a housing wall 10. The conductor terminal 12 mounted in an orifice 10a in the housing wall 10 and is made of a metallic conductor, for example with a nickel-plated finish. It should be noted that the end portions of the conductor terminal 12 protruding from the housing wall 10 may have any suitable shape for connecting other wiring elements, connectors, clamps or the like. The housing wall 10 may be part of a motor or battery housing or of a non-conductive connector housing.

Figure 3:
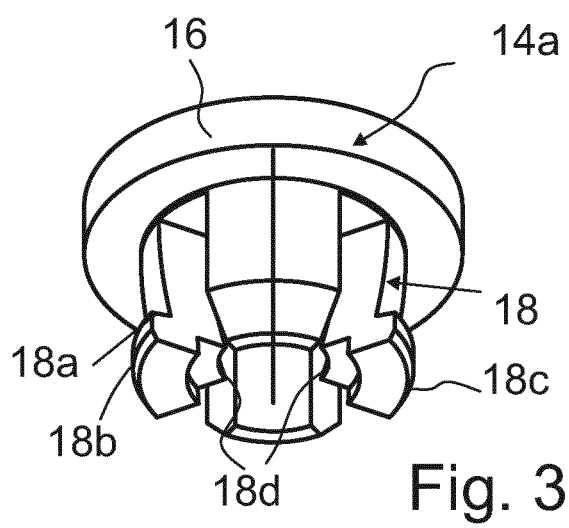
FIG. 3 illustrates a mounting member of the high current terminal of FIGS. 1 and 2 in a perspective view.
Figure 4:
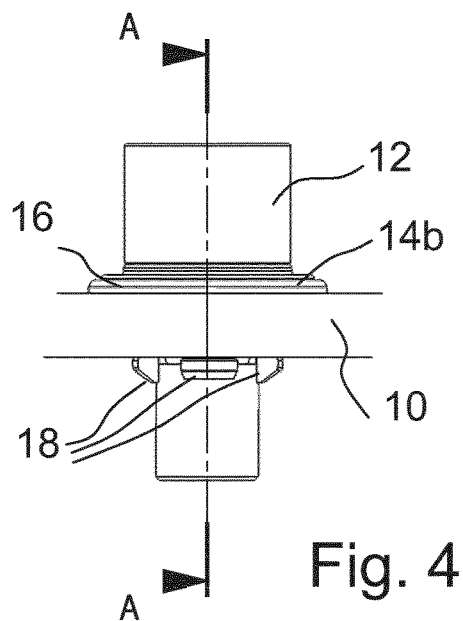
FIG. 4 illustrates a high current terminal according to a second embodiment of the invention in a side view.
Figure 5:
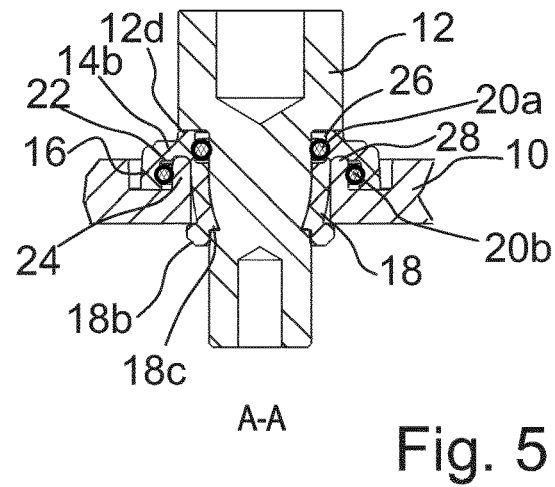
FIG. 5 illustrates the high current terminal of FIG. 4 in a sectional view.
Figure 6:
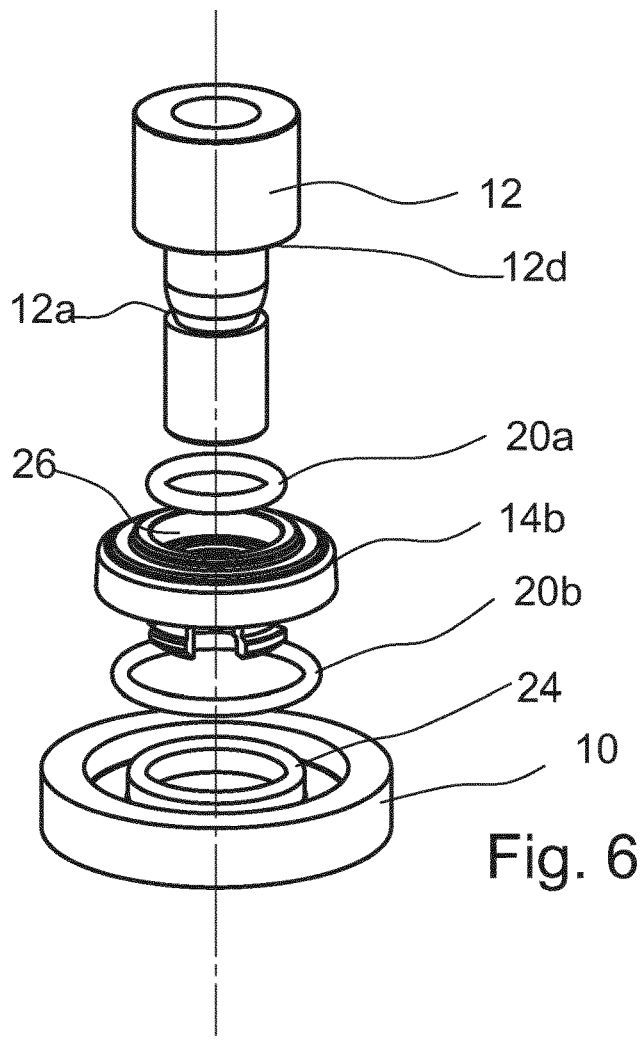
FIG. 6 illustrates the high current terminal of FIGS. 3 and 5 an explosion view.
Figure 7:
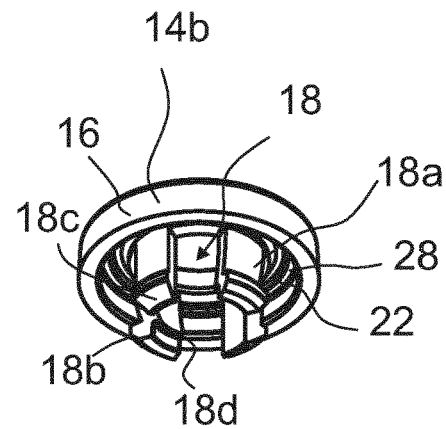
FIG. 7 illustrates a mounting member of the high current terminal assembly of FIGS. 4-6 in a perspective view.

The mounting module 14a, which is illustrated in more detail in FIG. 3, is a non-conductive element, e.g. made of plastics and includes a collar structure 16 configured to abut to a first side of said housing wall 10 surrounding the orifice 10a, and an insertion part 18 of generally cylindrical shape configured to be inserted into the orifice 10a of the housing wall 10.

A remote end of the insertion part 18 in the insertion direction is provided with first snap-fitting structures formed as a plurality of latches 18b extending in an axial direction. A radially outer surface of each of the latches 18a is provided with a snap-fitting protrusion 18b configured to engage with second side of said housing wall 10 opposite to the first side of the housing wall 10. The protrusions 18b may directly snap on the back surface of the second side of the housing wall 10 or on a shoulder provided by one or more sunk portions surrounding the orifice 10a, e.g. on the bottom of a counterbore.

When the mounting module 14a is inserted into the orifice 10a, tapered or rounded end faces 18c of the snap-fitting structures 18a abut to an inner surface of the orifice 10a such that the latches 18a are deflected radially inward to thereby reduce a diameter of a circle formed by the radially inner surfaces of the latches 18b to a value below the outer diameter of the conductor terminal 12. When the mounting module 14a has reached its target position, the protrusions 18b snap onto their corresponding mating structures and the latches 18a can return to their original axial orientation. The inner diameter of the circle formed by the latches 18b is then increased again to a value equal to or larger than the diameter of the conductor terminal 12.

The collar structure 16 of the mounting module 14a has a diameter larger than the diameter of the orifice 10a. When the mounting module 14a is fully mounted, i.e. snapped in place, the collar structure 16 abuts to the first surface 10b of the housing wall 10. In the embodiment of FIG. 1, the orifice 10a is provided with and surrounded by a counterbore 10c and the collar structure 16 abuts to the flat-bottomed surface 10b of a counterbore 10c. The mounting module 14a is then tightly held in the orifice 10a of the housing wall 10.

The first end of the conductor terminal 12 is configured to be inserted into a central opening of the mounting module 14a such that engagement of first snap-fitting structures 18a with the a second side said housing wall 10 is locked by the insertion of said first end of said conductor terminal 12. The central opening is surrounded by the latches 18a and has the diameters as described above. If the mounting module 14a is not properly inserted up to its target position, the protrusions 18b of one or more of the latches 18a abuts to the radially inner surface of the orifice 10a in the housing wall 10 and the conductor terminal 12 cannot be inserted. A locking of the connection is therefore not possible as long as the snap-fitting structures 18a are not properly snapped in.

A further set of snap-fitting protrusions 18d protruding radially inward is provided on a radially inner surface of the latches 18a. The remote end of the conductor terminal 12 has a chamfer configured to deflect the ends of the snap-fitting structures 18a radially outward when being inserted into the opening of the mounting module 14a. The conductor terminal 12 includes a recessed step portion 12a for accommodating the inner snap-fitting protrusions 18d at ends of latches 18a when the conductor terminal 12 has reached its final insertion position. It is noted that the outer and inner snap-fitting protrusions 18a, 18b may be provided on each of the latches 18a.

Alternatively, the different types of snap-fitting protrusions 18a, 18b may be provided on different subsets of latches, e.g. in an alternating manner.

The conductor terminal 12 further includes a first abutment collar 12b abutting with an end face of the mounting module 14a when the conductor terminal 12 has reached its final insertion position. A further, second abutment collar 12c with a diameter larger than the diameter of the first abutment collar 12b is provided at a distance to the first abutment collar 12b. The second abutment collar 12c has a diameter larger than the diameter of the counterbore 10c and abuts the wall surface surrounding the counterbore 10c when the conductor terminal 12 has reached its final insertion position.

An O-ring 20 to be arranged on an outer circumference of the conductor terminal 12 between the first and the second abutment collars 12b, 12c. The O-Ring 20 contacts the radially inner surface of the counterbore 10c and seals the assembly.

FIGS. 4-7 show a second embodiment of the invention designed for lager high current connector terminals. The following description is limited to differences to the first embodiment, while reference to the above description of the first embodiment is made with regard to features with are identical or substantially identical in order to avoid repetitions.

The collar structure 16 of the mounting module 14b according to the second embodiment includes double-wall structure with a ring-shaped recess 22 configured to accommodate an axial collar 24 surrounding orifice 10a provided on the first side of said housing wall 10. A groove 28 in the bottom surface of the ring-shaped recess 22 abuts to the axial end of the axial collar 24 of the housing wall 10 when the mounting module 14b is snapped in its final position. A single collar 12d is provided on the conductor terminal 12 and abuts to an abutment surface of the mounting module 14b on the backside of the ring-shaped recess 22 when the mounting module 14b is snapped in its final position. The module 14b isolates the conductor terminal from the housing wall 10 and is therefore suitable for use in combination with conductive housings.

A proximal end of the mounting module 14b is provided with a counterbore 26 accommodating a first O-ring 20a arranged between the radially outer surface of the conductor terminal 12 and the inner surface of the counterbore 26 to provide a sealing between the conductor terminal 12 and the mounting module 14b. A second O-ring 20b is provided between a radially outer surface of the axial collar 24 of the housing wall 10 and an inner surface of the ring-shaped recess 22 to provide a sealing between the housing wall 10 and the mounting module 14b.

Figure 8:
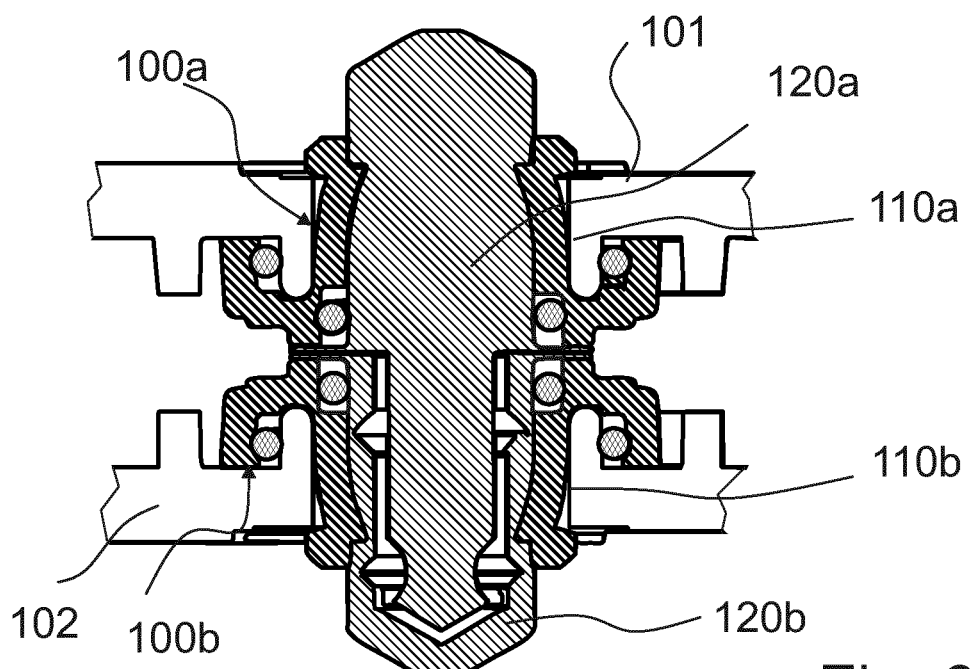
FIG. 8 is a system with a double-wall structure including two high current terminal assemblies according to the invention connected to each other.

FIG. 8 illustrates system including a first and a second connector assembly 100a, 100b configured to mount first and second conductor terminals 120a, 120b in orifices 110a, 110b in a first and second housing walls 101, 102, wherein the first and second housing walls 101, 102 form a double-wall and wherein the mount first and second conductor terminals 120a, 120b are matching male and female conductor terminals engaging with each other in a mounted condition.

The first and second connector assemblies are identical besides the male and female end portions of the connector terminal. Unless otherwise specified, the above description applies to both the first and second connector assembly mutatis mutandis. The connector assemblies of the system of FIG. 8 are connector assemblies of the second embodiment described with reference to FIGS. 4-7.

Figure 2:
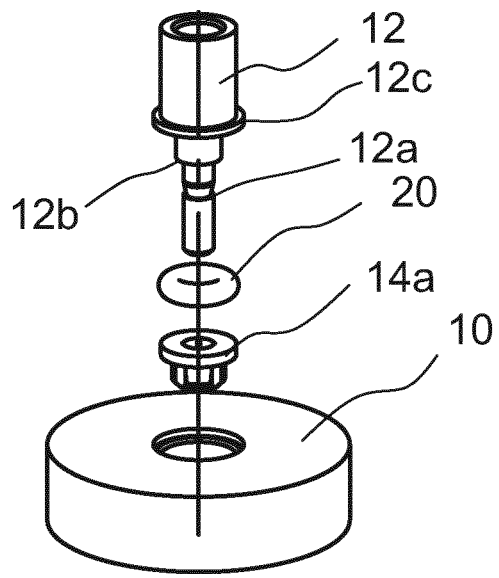
FIG. 2 illustrates the high current terminal of FIG. 1 in an explosion view.
Figure 9:
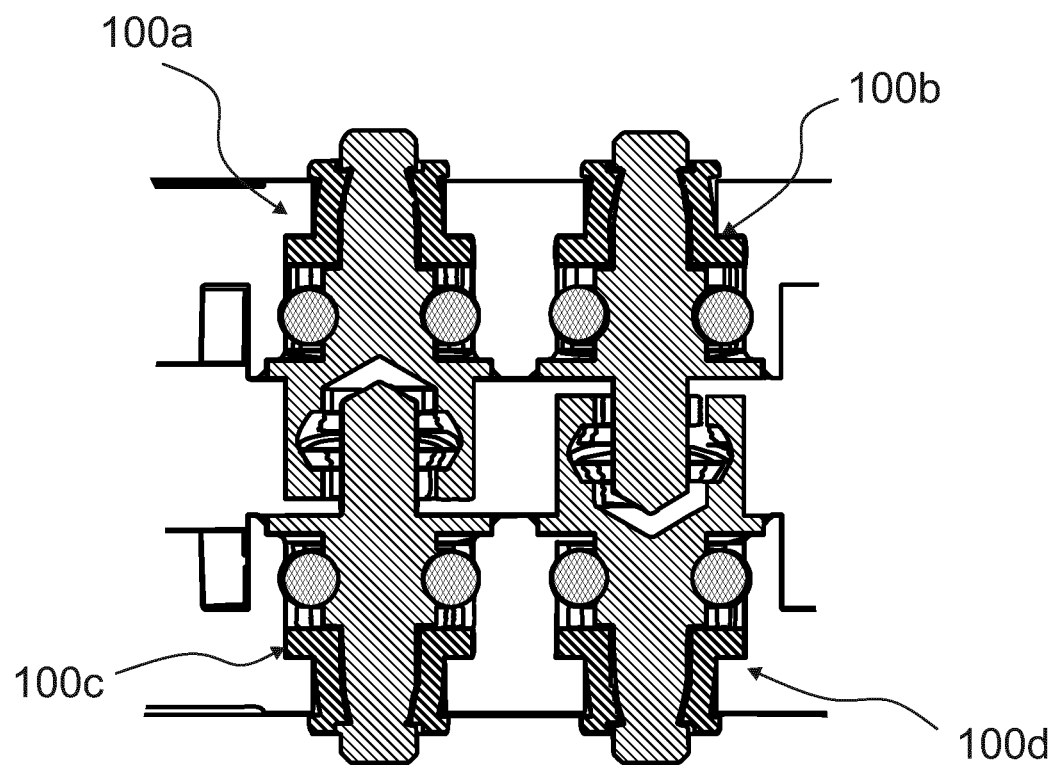
FIG. 9 is a system with a double-wall structure including four high current terminal assemblies according to the invention.

FIG. 9 is a system with a double-wall structure including four high current terminal assemblies 100a-100d according to the invention, which are connected pairwise. The connector assemblies of the system of FIG. 9 are connector assemblies of the second embodiment described with reference to FIGS. 1-3.

Figure 10:
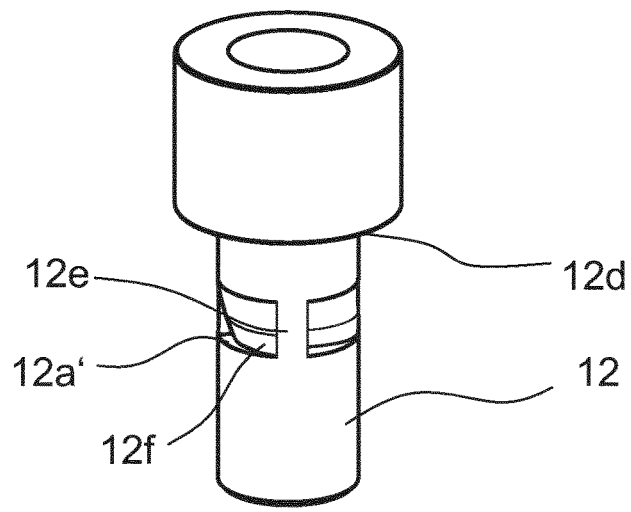
FIG. 10 is a conductor terminal according to a further embodiment of the invention with a releasable mounting module.
Figure 11A:
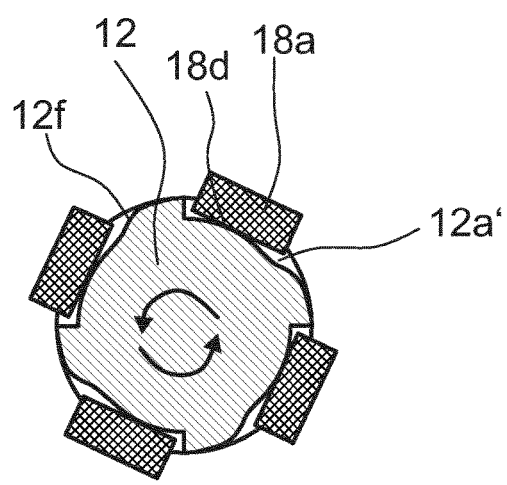
FIGS. 11a and 11b are illustrations of the locked and released configuration of the assembly with the conductor terminal of FIG. 10.
Figure 11B:
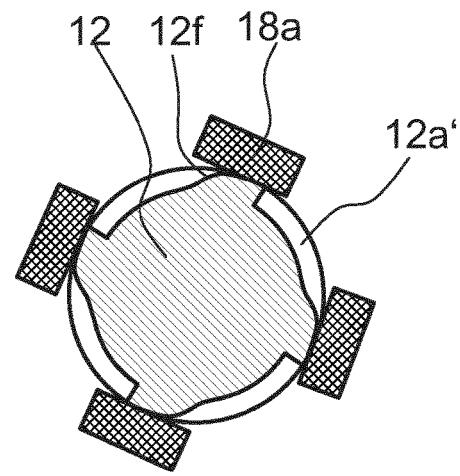

FIG. 10 illustrates a conductor terminal 12 according to a further embodiment of the invention with a releasable mounting module in a radial sectional view. The conductor terminal 12 in FIG. 10 differs from the conductor terminal 12 in FIG. 6 by including four recessed step portions 12a' at equal spacing around the circumference of the lower portion of the conductor terminal 12. The recessed step portions 12a' are separated by portions 12e having the full diameter of the lower portion of the conductor terminal 12. At least on one side of the recessed step portions 12a', a slope 12f is provided, which continuously connects the recessed step portion 12a' with the portions 12e FIGS. 11a and 11b are illustrations of the locked and released configuration of the assembly with the conductor terminal of FIG. 10. In the locked configuration of FIG. 11a, the snap-fitting protrusions 18d at ends of latches 18a engage with one of the recessed step portions 12a' and the assembly is locked. The connection can be released by rotating the conductor terminal 12 about 45°. The snap-fitting protrusions 18d are then pushed radially outward by the slopes 12f until reaching the portions 12e with the full diameter in the unlocked configuration as illustrated in FIG. 11b. The conductor terminal 12 can then be pulled out of the mounting module 14b, which unlocks the mounting module such that the latches 18a can be released from the housing wall.

LIST OF REFERENCE NUMBERS 10 housing wall
10a orifice
10c counterbore
12 conductor terminal
12a recessed step portion
12b first abutment collar
12c second abutment collar
12d abutment collar
14a; 14b mounting module
16 collar structure
16 ring-shaped recess
18 insertion part
18a snap-fitting structures
18b snap-fitting protrusion
18c tapered end faces
18d snap-fitting protrusion
20 O-ring
20a first O-ring
20b second O-ring
22 ring-shaped recess
24 axial collar
26 counterbore
28 groove

The invention claimed is:

1. A high current terminal assembly including a conductor terminal (12), said conductor terminal (12) being operatively arranged to be mounted in an orifice (10 a) in a housing wall (10), and a mounting module (14 a; 14 b) for mounting the conductor terminal (12) to the housing wall (10), said mounting module (14a; 14b) comprising:
a collar structure (16) configured to abut to a first side of said housing wall (10) surrounding said orifice (10 a), and
an insertion part (18) configured to be inserted into the orifice (10 a) of the housing wall (10), wherein a remote end of the insertion part (18) in the insertion direction is provided with first snap-fitting structures (18 a) engaging a second side of said housing wall (10) opposite to the first side of the housing wall, wherein a first end of said conductor terminal (12) is configured to be inserted into an opening of said mounting module (14 a; 14 b) such that engagement of first snap-fitting structures (18 a) with a second side of said housing wall (10) is locked by the insertion of said first end of said conductor terminal (12);
wherein the remote end of the conductor terminal (12) is configured to deflect the ends of the snap-fitting structures (18 a) radially outward when being inserted into the opening of said mounting module (14 a; 14 b) and includes a plurality of recessed step portions (12 a, 12 a') for accommodating the ends of the snap-fitting structures (18 a) when the conductor terminal (12) has reached its final insertion position; and
wherein the plurality of recessed step portions (12 a') each accommodate the end of one of the snap-fitting structures (18 a) in specific ranges of angular orientations with a sloped surface (12 f) extending from each of the recessed step portions (12 a') in at least one circumferential direction such that the engagement between the plurality of recessed step portion (12 a, 12 a') and the snap-fitting structures (18 *a*) is releasable by rotating the conductor terminal (12).

2. The high current terminal assembly according to claim 1, wherein a proximal end of the conductor terminal (12) includes an abutment collar (12 *b*) abutting with an end face of the mounting module (14 *a*; 14 *b*) when the conductor terminal (12) has reached its final insertion position.

3. The high current terminal assembly according to claim 1, further including an O-ring to be arranged on an outer circumference of the conductor terminal (12).

4. The high current terminal assembly according to claim 1, wherein the housing wall (10) is a motor housing.

5. The high current terminal assembly according to claim 1, wherein the housing wall (10) is a battery housing.

6. A high current terminal assembly including a conductor terminal (12), said conductor terminal (12) being operatively arranged to be mounted in an orifice (10 *a*) in a housing wall (10), and a mounting module (14 *a*; 14 *b*) for mounting the conductor terminal (12) to the housing wall (10), said mounting module (14 *a*; 14 *b*) comprising:
  a collar structure (16) configured to abut to a first side of said housing wall (10) surrounding said orifice (10 *a*), and
  an insertion part (18) configured to be inserted into the orifice (10 *a*) of the housing wall (10), wherein a remote end of the insertion part (18) in the insertion direction is provided with first snap-fitting structures (18 *a*) engaging a second side of said housing wall (10) opposite to the first side of the housing wall, wherein a first end of said conductor terminal (12) is configured to be inserted into an opening of said mounting module (14 *a*; 14 *b*) such that engagement of first snap-fitting structures (18 *a*) with the a second side said housing wall (10) is locked by the insertion of said first end of said conductor terminal (12);
  wherein the collar structure (16) includes a ring-shaped recess (22) configured to accommodate an axial collar (10 *b*) surrounding said orifice (10 *a*) provided on the first side of said housing wall (10), wherein an O-Ring is provided between a radially outer surface of the axial collar (10 *b*) of the housing wall (10) an inner surface of the ring-shaped recess (16).

7. A system, comprising:
a first connector assembly and a second connector assembly configured to mount a first conductor terminal (120 *a*) and a second conductor terminal (120 *b*) in a first orifice (110 *a*) and a second orifice (110 *b*) in a first housing wall (101) and a second housing wall (102) that form a double-wall;
wherein the first conductor terminal (120 *a*) and the second conductor terminal (120 *b*) are matching male and female connector terminals engaging with each other in a mounted condition;
wherein the first connector assembly has a mounting module (14 *a*; 14 *b*) comprising a collar structure (16) configured to abut to a first side of the first housing wall (101) surrounding the first orifice (110 *a*), and an insertion part (18) configured to be inserted into the first orifice (110 *a*);
wherein a remote end of the insertion part (18) in the insertion direction is provided with first snap-fitting structures (18 *a*) engaging a second side of the first housing wall (101);
wherein a first end of said first conductor terminal (120 *a*) is configured to be inserted into an opening of said mounting module (14 *a*; 14 *b*) such that engagement of first snap-fitting structures (18 *a*) with the second side of said housing wall (101) is locked by the insertion of said first end of said conductor terminal (120 *a*).

\* \* \* \* \*